US010782912B2

(12) United States Patent
Gerlach et al.

(10) Patent No.: US 10,782,912 B2
(45) Date of Patent: Sep. 22, 2020

(54) METHOD, DEVICE, AND COMPUTER PROGRAM FOR MANAGING A STORAGE REGION OF A CONTROLLER OF A TRANSPORTATION VEHICLE

(71) Applicant: VOLKSWAGEN AKTIENGESELLSCHAFT, Wolfsburg (DE)

(72) Inventors: Simon Gerlach, Meine (DE); André Zierfuss, Berlin (DE); Sven Wiethölter, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 83 days.

(21) Appl. No.: 16/092,598

(22) PCT Filed: Mar. 27, 2017

(86) PCT No.: PCT/EP2017/057186
§ 371 (c)(1),
(2) Date: Oct. 10, 2018

(87) PCT Pub. No.: WO2017/178214
PCT Pub. Date: Oct. 19, 2017

(65) Prior Publication Data
US 2019/0121568 A1    Apr. 25, 2019

(30) Foreign Application Priority Data

Apr. 13, 2016    (DE) .................... 10 2016 206 207

(51) Int. Cl.
G06F 12/00    (2006.01)
G06F 3/06    (2006.01)

(52) U.S. Cl.
CPC .......... G06F 3/0649 (2013.01); G06F 3/0605 (2013.01); G06F 3/067 (2013.01);
(Continued)

(58) Field of Classification Search
CPC combination set(s) only.
See application file for complete search history.

(56) References Cited

U.S. PATENT DOCUMENTS

| 2015/0052215 | A1 | 2/2015 | Luna |
| 2015/0208205 | A1* | 7/2015 | Chan .................... G06F 16/125 |
| | | | 709/217 |
| 2015/0373116 | A1 | 12/2015 | Mo et al. |

FOREIGN PATENT DOCUMENTS

KR    20080016163 A    2/2008

OTHER PUBLICATIONS

Search Report for German Patent Application No. 10 2016 206 207.7; dated May 2, 2016.
(Continued)

*Primary Examiner* — Yong J Choe
(74) *Attorney, Agent, or Firm* — Barnes & Thornburg LLP (57) ABSTRACT

A method, a device, and a computer program for managing a storage region of a controller of a transportation vehicle. One or more user-specific datasets are stored in the storage region. The method includes monitoring an available storage capacity of the storage region, obtaining a new user-specific dataset, transferring data from the storage region of the controller to an external storage unit in response to the available storage capacity not being sufficient for storing the new user-specific dataset in the storage region, and storing the new user-specific dataset in the storage region.

11 Claims, 3 Drawing Sheets

(52) U.S. Cl.
CPC .......... *G06F 3/0608* (2013.01); *G06F 3/0647* (2013.01); *G06F 3/0653* (2013.01)

(56) References Cited

OTHER PUBLICATIONS

Search Report for International Patent Application No. PCT/EP2017/057186; dated Jun. 27, 2017.

* cited by examiner

METHOD, DEVICE, AND COMPUTER PROGRAM FOR MANAGING A STORAGE REGION OF A CONTROLLER OF A TRANSPORTATION VEHICLE

PRIORITY CLAIM

This patent application is a U.S. National Phase of International Patent Application No. PCT/EP2017/057186, filed 27 Mar. 2017, which claims priority to German Patent Application No. 10 2016 206 207.7, filed 13 Apr. 2016, the disclosures of which are incorporated herein by reference in their entireties.

SUMMARY

Illustrative embodiments relate to a method, a device, and a computer program for managing a storage region of a controller of a transportation vehicle, more precisely, but not exclusively, based on a transfer of data from the storage region and storage of a new user-specific dataset after the transfer.

BRIEF DESCRIPTION OF THE DRAWINGS

Disclosed embodiments are recited in detail below with reference to the drawings, but the disclosure is not generally overall restricted to these exemplary embodiments. In the figures.

DETAILED DESCRIPTION

A connection of transportation vehicles to central locations on the internet is an important trend in transportation vehicle construction. For example, setting of the transportation vehicle can thus be updated via the internet, for example, available radio transmitters, or navigation data.

Furthermore, it can be desirable to transfer settings used in a transportation vehicle, for example, radio transmitters, seat position, navigation destinations, or similar, between transportation vehicles. In conventional systems in this case, for example, settings can be transmitted via a read-only memory, possibly a flash memory, or files can be stored in a user profile on the internet and retrieved by the transportation vehicle via an internet connection. This can be made difficult by the fact that a storage capacity of controllers to accommodate user settings can be limited. For example, some controllers can accommodate only a smaller number of user-specific datasets of different users. If a transportation vehicle is regularly used by different users, for example, in a transportation vehicle fleet of a company or in car sharing, the controllers possibly cannot accommodate all the user settings of the different users.

There is therefore a need for an improved concept for storing user settings for a transportation vehicle. This need is met by the method, the device and the computer program as claimed in the independent claims.

Exemplary embodiments, for example, provide a method for managing a storage region of a controller of a transportation vehicle. The method can, for example, be configured to manage an available storage capacity of one or more controllers of the transportation vehicle. If the available storage capacity of the controllers is meager, the method can, for example, transfer data from the storage region of the controllers, for example, to a storage module of a central controller and, for example, then store new user-specific datasets at the storage location in the memory module of the controller that is now free.

Exemplary embodiments provide a method for managing a storage region of a controller of a transportation vehicle. One or more user-specific datasets can be stored in the storage region. The method comprises monitoring an available storage capacity of the storage region. The method further comprises obtaining a new user-specific dataset. The method further comprises transferring data from the storage region of the controller to an external storage unit if the available storage capacity is not sufficient for storing the new user-specific dataset in the storage region. The method further comprises storing the new user-specific dataset in the storage region. The method enables both a rapid change between user-specific datasets for user-specific datasets stored in the storage region and a use of a plurality of user-specific datasets for which the storage region is not sufficient. Furthermore, it is possible to exchange user-specific datasets without losing data of the storage region in which the new user-specific dataset is stored.

The controller is mentioned here, for example, for one or more controllers. The method can, for example, also be used to manage the storage region of a plurality of controllers of the transportation vehicle, possibly by monitoring, obtaining a new user-specific dataset, transferring data and storing the new user-specific dataset for one or more controllers.

In an exemplary embodiment, the storage region can comprise a plurality of storage locations. One storage location can, for example, offer data storage for one dataset. The method can further comprise selecting a storage location of the plurality of storage locations. The transfer of the data can transfer the data from the selected storage location. The storage of the new user-specific dataset can use the selected storage location. The use of storage locations enables a simplified management of the available storage capacity. The transfer of the data from one storage location and subsequent storage of the new user-specific dataset makes it possible to exchange data without resulting in data losses.

In some exemplary embodiments, the selection of the storage location can be based on at least one element of the group of last use of the user-specific dataset which is stored in the storage location and the usage frequency of the user-specific dataset which is stored in the storage location. The selection of the storage location based on the criteria can in some exemplary embodiments reduce the need to transfer data, since, for example, frequently used user-specific datasets are not transferred.

In some exemplary embodiments, the monitoring of the available storage capacity can comprise monitoring a usage of the plurality of storage locations. The monitoring of the usage can, for example, comprise monitoring the occupancy of the storage locations or monitoring the usage times or frequencies of the storage locations. The monitoring of the storage locations allows an improved transfer of the data from the storage location and/or an improved selection of the storage location.

In some exemplary embodiments, the obtaining of the new user-specific dataset can comprise receiving the new user-specific dataset from a server. This makes it possible to retrieve user-specific datasets of a user who has not so far used the transportation vehicle or is no longer using the transportation vehicle. Alternatively or additionally, the obtaining of the new user-specific dataset can comprise retrieving the new user-specific dataset from a data structure, possibly a database, a binary file or a folder structure. The retrieval of the new user-specific dataset from a data structure makes it possible to use previously transferred or preemptively synchronized user-specific datasets.

In at least some exemplary embodiments, the transfer of the data can further comprise a retrieving of the data from the controller and a storage of the data in a data structure on a central controller of the transportation vehicle. This enables data to be stored on a central controller, which, for example, can be configured to store large datasets, for example, when the data is not required instantaneously and, for example, to restore it in the controller when the data is required again.

In at least some exemplary embodiments, the transferring can further be carried out periodically. Alternatively or additionally, the transferring can be further carried out when the data has been amended. Alternatively or additionally, the transferring can be carried out before the storage of the data. This makes it possible, for example, to synchronize the data with a central location, possibly by a central controller. Furthermore, the storage can possibly be carried out as soon as the new user-specific dataset was obtained, for example, if the transferred user-specific dataset was not amended.

In some exemplary embodiments, the method can further comprise activating the new user-specific dataset for the controller. The activating of the user-specific dataset enables the user-specific dataset to be used by the controller.

Exemplary embodiments further comprise a program with a program code for executing the method as claimed in one of the preceding claims, when the program code is executed on a computer, a processor, a control module, or a programmable hardware component.

Exemplary embodiments further provide a device for a first controller of a transportation vehicle for managing a storage region of a second controller of the transportation vehicle. The device comprises an interface configured for communication with the second controller. The device further comprises a control module configured for monitoring an available storage capacity of the storage region. The control module is further configured for obtaining a new user-specific dataset. The control module is further configured for transferring data from the storage region of the controller to a storage module if the available storage capacity is not sufficient for storing the new user-specific dataset in the storage region. The control module is further configured for storing the new user-specific dataset in the storage region.

Various exemplary embodiments are now described in more detail with reference to the appended drawings which show some exemplary embodiments. In the figures the thickness dimensions of lines, layers, and/or regions may have been exaggerated for the sake of clarity.

In the following description of the appended figures, which merely show some exemplary embodiments as an example, the same reference numbers can designate the same or comparable components. Furthermore, summarizing reference numbers can be used for components and objects which occur multiple times in an exemplary embodiment or in a drawing, but are described jointly with regard to one or more features. Components or objects described with the same or summarizing reference numbers can be the same with regard to individual, a plurality of or all the features, for example, the dimensions of the components or objects, but can optionally also be implemented differently, unless anything different is obtained explicitly or implicitly from the description.

Although exemplary embodiments can be modified and changed in various ways, exemplary embodiments are shown in the figures as examples and are described herein in detail. However, it should be clarified that it is not intended to restrict exemplary embodiments to the respectively disclosed forms but that exemplary embodiments should rather cover all the functional and/or structural modifications, equivalents, and alternatives which lie within the scope of the disclosure. The same reference numbers denote the same or similar elements in the overall description of the figures.

It is noted that an element that is designated as "connected" or "coupled" to another element can be directly connected or coupled to the other element or that interposed elements can be provided. If, on the other hand, an element is designated as "directly connected" or "directly coupled" to another element, no interposed elements are provided. Other terms, which are used to describe the relationship between elements, should be interpreted in a similar manner (e.g., "between" compared with "directly between", "adjacent" compared with "directly adjacent" etc.).

The terminology used herein is only used to describe specific exemplary embodiments and should not restrict the exemplary embodiments. As used herein, the singular forms "a", "an", "one" and "the" should also include the plural forms as long as the context does not clearly specify something different. It should also be clarified that the expressions such as, for example, "includes", "including", "has", "comprises", "comprising" and/or "having" as used herein indicate the presence of specified features, integers, operations, work sequences, elements, and/or components but do not exclude the presence or the addition of one or one or more features, integers, operations, work sequences, elements, components, and/or groups thereof.

Unless otherwise defined, all the terms used herein (including technical and scientific terms) have the same meaning which is ascribed to them by an average person skilled in the art in the field to which the exemplary embodiments belong. It should be further clarified that expressions, for example, those which are defined in dictionaries in general use, should be interpreted as having the meaning consistent with their meaning in the context of the relevant technology and should not be interpreted in an idealized or excessively formal sense as long as this is not expressly defined herein.

In some conventional transportation vehicles, a user can select one of several sets of user settings (e.g., when starting the transportation vehicle), which are then activated. All the settings which he changes from then on are stored in this set of user settings. This can be used to enable a multiuser operation in the transportation vehicle or to enable a driver to use several profiles.

For this function, several sets of settings must be stored. The settings are usually distributed in the controllers in the transportation vehicle. Since storage space in these controllers is limited and expensive, only a few sets of settings are stored, typically about 4 to 8. Storage locations are also designated henceforth as slots. However, it is possible that transportation vehicles are used by more different users (or with more profiles) than slots held in readiness in the controllers. This is the case, for example, with rental cars, pool transportation vehicles, car sharing etc.

As soon as a new user wishes to use such a transportation vehicle (or a user wishes to use a new profile) and all the slots are already occupied, he must overwrite sets of settings of other users. Usually for this purpose in conventional systems, he must manually select the slot to be overwritten. In some cases, sets of settings can, for example, be exported to removable media or into the cloud and reproduced therefrom.

The previous settings are lost in the overwritten slot. Even if these can be reproduced via removable media or the cloud, this is complex/inconvenient, costs data volume or at least time for the reconstruction. In addition, a new user frequently cannot decide which slots should be appropriately overwritten since he does not known when/whether which other user will presumably use the transportation vehicle again.

Figure 2:
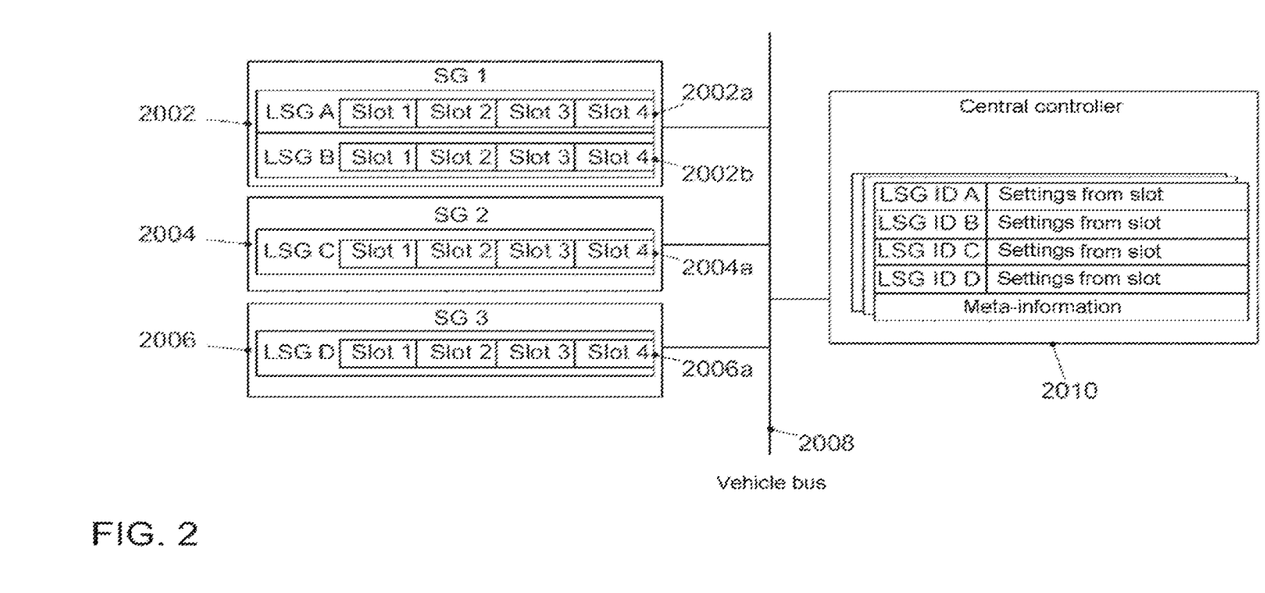
FIG. 2 shows an exemplary overview of controllers of a transportation vehicle.

In at least some exemplary embodiments, a central controller (SG) having a large amount of (cheap) storage space can manage sets of settings (user-specific datasets) and available storage locations (also memory slots, or slots for short) in the other controllers. FIG. 2 shows an exemplary overview. Controllers 2002; 2004; 2006 with logic controllers (LSG) 2002a; 2002b; 2004a; 2006a comprise a plurality of banks (storage locations, slots) of user-specific datasets with setting values of the respective logic controller. The logic controllers are, for example, addressable via logic controller indicators and independently of a physical location. For example, a control module or processor can be configured to execute several logic controllers. The controllers are coupled via a transportation vehicle bus 2008 to a central controller 2010, which comprises a data structure with a plurality of user-specific datasets, for example, as user profiles (sets of user-specific datasets for several logic controllers) in the transfer and additional meta-information. This management can be accomplished, for example, with the aid of meta-information relating to the sets of settings, the logic controller identifiers, and bus messages in order in this way to substantially increase the quantity of available sets of settings without needing to hold in readiness more storage space or slots in the controllers therefor.

Figure 1:
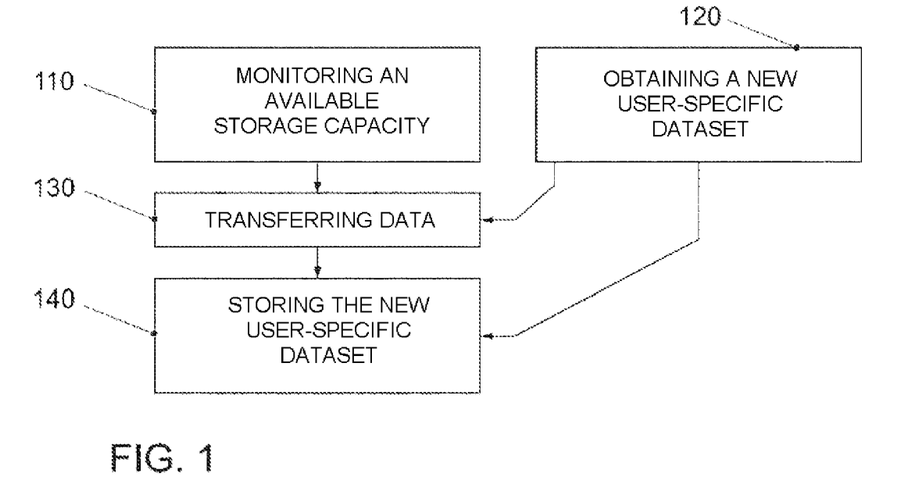
FIG. 1 illustrates a flow diagram of an exemplary embodiment of a method for managing a storage region of a controller of a transportation vehicle.

This central controller can, for example, control by bus message the other controllers, which store the sets of settings in their slots, possibly by monitoring 110 from FIG. 1. To this end, it can instruct these to place the contents of these settings of a specific slot on the transportation vehicle bus (possibly in a process operation transfer 130 from FIG. 1) or store settings from the transportation vehicle bus in a specific slot (possibly by storing 140 from FIG. 1). In addition, it can instruct the controllers to activate the set of settings in a slot, possibly by activating 150 from FIG. 1b.

The central controller can manage the available slots in such a manner (possibly in the monitoring 110) that the sets of settings presently being used are always loaded in a slot and activated. If a set of settings which is not presently loaded in a slot is to be activated, the central controller can ensure that this is in an automatically (possibly by selecting 115 from FIG. 1b) loaded into a certain slot without thereby losing the sets of settings stored previously in this slot. For this purpose these can be "transferred" into the storage module of the central controller (possibly by transferring 130). In some exemplary embodiments, sets of settings in this transferring can be reactivated at any time by loading them from the central controller again into a slot of the other controller, possibly by storing 140. The slot used for this purpose had been made free previously possibly by transferring again.

FIG. 1 illustrates a flow diagram of an exemplary embodiment of a method for managing a storage region of a controller of a transportation vehicle 1000. The storage region can, for example, correspond to a computer-readable and describable storage module, which can be configured to store settings of the controller. The controller can, for example, correspond to one of several controllers of the transportation vehicle 1000, for example, configured to control a transportation vehicle function, for example, to control transportation vehicle air-conditioning functions, seat settings, or settings of entertainment electronics. The controller can, for example, also correspond to a logic controller, for example, for controlling a transportation vehicle function in a control module, which can comprise or execute a plurality of logic controllers. One or more user-specific datasets can be stored in the storage region. The user-specific datasets comprise, for example, user settings for the controller, for example, the settings which were set by the user. In some exemplary embodiments, the one or more user-specific datasets can be comprised in one or more user profiles, wherein a user profile can comprise user-specific datasets for one or more controllers. The storage region comprises, for example, storage locations or sub-storage regions for one or more user-specific datasets. The user-specific datasets can, for example, have a fixed size and be present as a bit vector or in a defined protocol. In some exemplary embodiments, the user-specific datasets can further comprise one or more components, which can have a fixed or variable size.

Figure 1A:
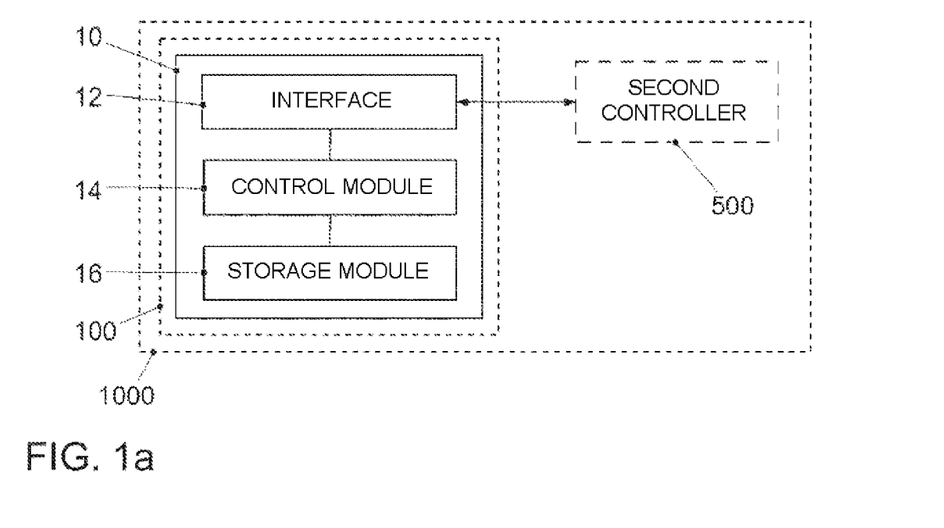
FIG. 1a illustrates a block diagram of an exemplary embodiment of a device for a first controller of a transportation vehicle, for managing a storage region of a second controller of the transportation vehicle.

FIG. 1a illustrates a block diagram of an exemplary embodiment of a device 10 for a first controller 100 of the transportation vehicle 1000 for managing a storage region of a second controller 500 of the transportation vehicle 1000, configured to execute the method. The second controller 500 can, for example, correspond to the controller, whose storage device is managed, from the description of the method from FIG. 1. The device comprises an interface, configured to communicate with the second controller 500. The device further comprises a control module 14, configured to execute the process operations, possibly the process operations at 110-150. The interface 12 can, for example, correspond to one or more inputs and/or one or more outputs for receiving and/or transmitting information, possibly in digital bit values, based on a code, inside a module, between modules, or between modules of different entities. The interface 12 can, for example, be configured to communicate via a control network bus (also controller area network bus, CAN bus) or a local connection network (also local interconnect network, LIN) for communication with the second controller 500. In exemplary embodiments, the control module 14 can correspond to any controller or processor or a programmable hardware component. For example, the control module 14 can also be implemented as software, which is programmed for a corresponding hardware component. In this respect, the control module 14 can be implemented as programmable hardware with correspondingly adapted software. In this case, any processors such as digital signal processors (DSPs) can be used. Exemplary embodiments are not restricted to a specific type of processor herein. Any processors or even a plurality of processors are feasible for implementing the control module 14.

The method comprises monitoring 110 an available storage capacity of the storage region. For example, the monitoring 110 can comprise a monitoring of an occupancy of one or more storage locations for the user-specific datasets. For example, the monitoring 110 can monitor a usage of the user-specific datasets, for example, a usage frequency, a usage duration, or a time of usage. In some exemplary embodiments, the monitoring 110 can assign user profiles of various users to the storage device used. For example, the monitoring 110 can assign in which part or storage location of a storage region data of a user profile is stored.

Figure 1B:
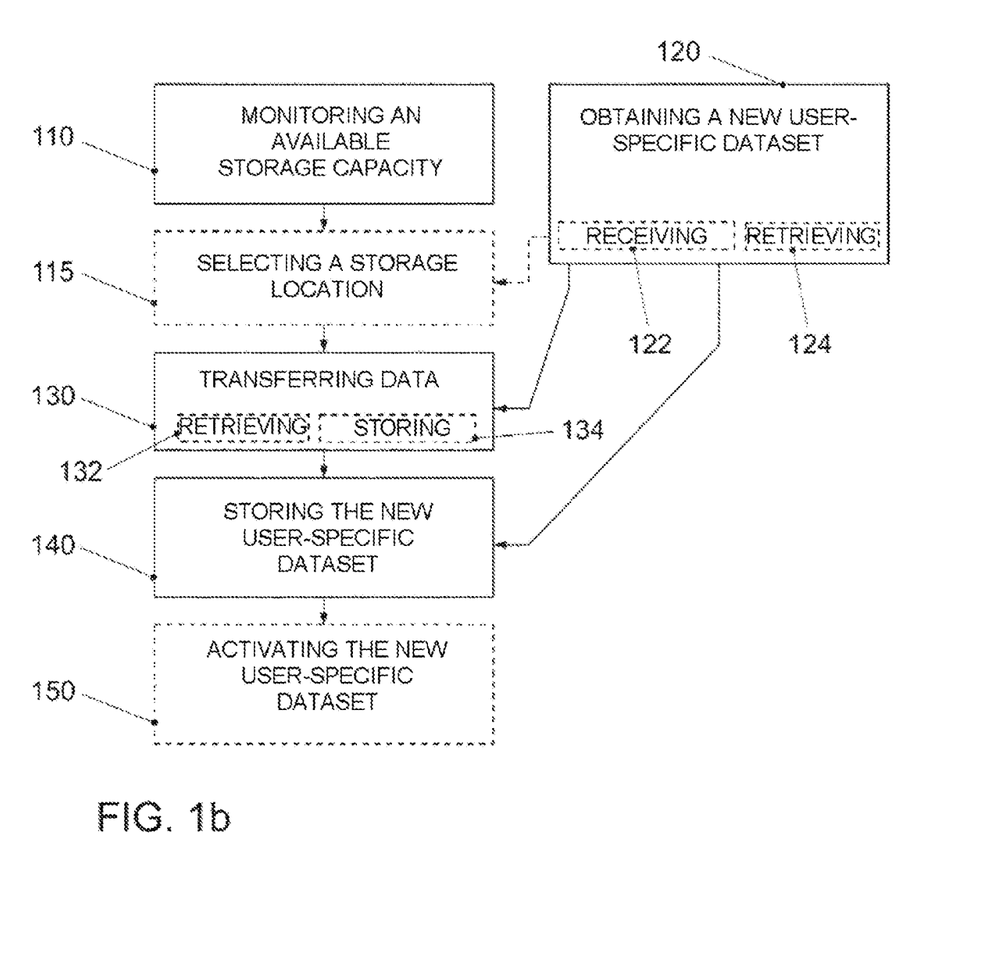
FIG. 1b illustrates a flow diagram of a further exemplary embodiment of a method for managing a storage region of a controller of a transportation vehicle.

The method further comprises obtaining 120 a new user-specific dataset. In some exemplary embodiments, as shown in FIG. 1*b*, the obtaining 120 of the new user-specific dataset can comprise a receiving 122 of the new user-specific dataset by a server, for example, via a mobile internet connection between the transportation vehicle 1000 and the server. For example, the control module 14 can be configured to communicate with the server via the interface 12 and/or a transceiver for a mobile radio system. The control module 14 can, for example, be configured to communicate with the server via at least one mobile radio system of the group of global system for mobile telecommunications (GSM), general packet radio service (GPRS), enhanced data rates for GSM evolution (EDGE), universal mobile telecommunication system (UMTS), long term evolution and a 5th generation (5G) mobile radio system. The transportation vehicle 1000 can, for example, comprise a transceiver module for at least one of the mobile radio systems. The server can, for example, correspond to a computer system connected to a network, for example, an individual server, a virtual server, a cloud server instance or at least a part of a computing center.

Alternatively or additionally the obtaining 120 of the new user-specific dataset, as further shown in FIG. 1*b*, can comprise a retrieving 124 of the new user-specific dataset from a data structure. The data structure can, for example, correspond to a database, a data-based data structure, a storage array, a list, or a similar data structure. For example, the data structure can comprise one or more user profiles, and the retrieving 124 can comprise a readout of the user-specific dataset from one of the one or more user profiles. The control module 14 can, for example, be configured to read out the data structure and/or store user-specific datasets in the data structure. The device further comprises a storage module 16 configured for storing the data structure. For example, the retrieving 122 can further comprise a storage of the new user-specific dataset in the data structure.

The method further comprises transferring 130 data from the storage region of the controller to an external storage device if the available storage capacity is not sufficient for storing the new user-specific dataset in the storage region. In some exemplary embodiments, the transferring 130 can correspond to an exporting of the data or comprise this. In some exemplary embodiments, the transferring 130 can be executed after receiving the user-specific dataset. Alternatively or additionally, the transferring 130 can further be carried out periodically, for example, even before the obtaining 120. The transferring 130 can, for example, further be executed when the data in the storage region have been amended, for example, after a waiting time in which further amendments are awaited, possibly after a slight delay after an operating action to reduce the number of messages with a rapid sequence of operating actions. In some exemplary embodiments, the delay cannot exceed an upper limit of a few seconds. In some exemplary embodiments, the transferring 130 can further comprise a checking as to whether the data have been amended since the last transferring 130, for example, by a comparison of time stamps or based on a dirty flag. The amendment can be displayed, for example, by a notification relating to an amendment of the user-specific dataset (also dirty notification) and/or the user-specific dataset in the storage region can comprise a value which indicates that it has been amended since the last transferring (so-called dirty flag).

In some exemplary embodiments, the transferring 130 can, for example, comprise no deletion of the user-specific dataset. For example, the storing 140 can comprise an overwriting of the previous user-specific dataset or a deletion of the part of the storage region before the storing of the new user-specific dataset. Alternatively in some exemplary embodiments, the transferring 130 can also comprise a deletion of the transferred user-specific dataset in the storage region.

The transferring 130 of the data can, for example, as shown in FIG. 1*b*, further comprise a retrieving 132 of the data by the controller 500 and a storing 134 of the data in the data structure on a central controller 100 of the transportation vehicle 1000. The central controller can, for example, correspond to the first controller 100 from FIG. 1*a*. The control module 14 can, for example, be configured for retrieving 132 the data and for storing 134 the data on the storage module 16. The retrieving 132 can, for example, be executed via the interface 12 and via a transportation vehicle bus of the transportation vehicle. The storage module 16 can, for example, comprise at least one element of the group of computer-readable storage medium magnetic storage medium, optical storage medium, hard disk, flash memory, diskette, random access memory, programmable read only memory (PROM), erasable programmable read only memory (EPROM), and electronically erasable programmable read only memory (EEPROM). For example, the storage module 16 can be configured to provide a storage region for storing the data structure, which is larger than the storage region of the second controller 500.

The method further comprises a storing 140 of the new user-specific dataset in the storage region. The storing 140 can, for example, comprise the provision of the new user-specific dataset via the interface 12, possibly via the transportation vehicle bus, for the second controller 500, for example, together with control instructions for storing the new user-specific dataset. In an exemplary embodiments, the transferring 130 can be executed before the storing 140 of the data.

In some exemplary embodiments, the method, as shown in FIG. 1*b*, can further comprise activating 150 the new user-specific dataset for the controller 500. The control module 14 can, for example, be configured to provide a control signal via the interface 12 for activating 150 for the controller 500.

In an exemplary embodiment the controller 500, for example, stands for a controller of a plurality of controllers. The monitoring 110 can, for example, comprise a monitoring of a plurality of storage regions of the plurality of controllers. The obtaining 120 can comprise an obtaining of a user profile, which can comprise user-specific datasets for the plurality of controllers. The transferring 130 can, for example, transfer the data periodically for at least one subset of the plurality of controllers. For example, data of a user profile can be transferred 130 together. The storing 140 can, for example, store user-specific datasets of a user profile in the plurality of controllers.

In an exemplary embodiment, the storage region can comprise a plurality of storage locations. A storage location can, for example, correspond to a reserved sub-storage region, which forms the storage location for a user-specific dataset. The monitoring 110 of the available storage capacity can, for example, comprise a monitoring of a use of the plurality of storage locations. The method can, as shown in FIG. 1b, further comprise the selecting 115 of a storage location of the plurality of storage locations. The transferring 130 of the data can transfer the data from the selected storage location. The storing 140 of the new user-specific dataset can use the selected and, for example, previously transferred storage location.

In at least some exemplary embodiments, the selecting 115 of the storage location can be based on at least one element of the group of last use of the user-specific dataset, which is stored in the storage location, and usage frequency of the user-specific dataset which is stored in the storage location.

In at least one exemplary embodiment, the control module 14 is, for example, configured to hold various meta-information per user-specific dataset, for example, assignment of the datasets to user profiles
number of the slots into which the set of settings is loaded or empty
time of last usage
total number of usages
total duration of activation
time points/locations of previous activations (weekday, time, GPS position . . . )
priority flag, never transfer flag Possible strategies for selecting 115 the slot to be transferred from the set of all the user-specific datasets loaded into slots at the present time are oriented, for example, on the following parameters (examples):

the longest non-use
the rarest usage frequency
the shortest activation time

These parameters can each be collected absolutely, only for current users, only for the user who has not used the transportation vehicle for the longest, at the current/similar location, at similar times, within a specific time interval such as, for example, the last 2 weeks etc.

As soon as the storage module in the central controller is also fully occupied, during transfer of a further set of settings, a different set of settings can be determined automatically which is then forgotten ("displacement"). The aforesaid strategies can also be used, for example, for the displacement of the user-specific datasets from the data structure. In this case, it can further be considered whether a user-specific dataset can be reproduced by a server.

Before the user-specific dataset located in a slot can be overwritten (possibly by storing 140), in some exemplary embodiments it can be checked whether it has been transferred 130 in the central controller. To this end, this can instruct the other controllers via the transportation vehicle bus to export the content of the slot via the transportation vehicle bus, possibly by transferring 130. This can be accomplished, for example, at various time points:

periodically
after an amendment to the content of the slot
at the latest before overwriting The central controller can thus produce a transfer of the previous sets of settings only when required (when the slot is actually to be overwritten) or also, however, continuously keep the content of the slot (permanent snapshot).

In some exemplary embodiments, the transfer may be executed after absolutely the longest non-usage of all the sets of settings and the displacement optionally after the longest non-usage and possibility for restoration from the cloud. In some exemplary embodiments, a permanent snapshot can be held in the central controller by transferring after amendments to the storage locations.

The selecting 115 can, for example, comprise a determining of a slot to be displaced, e.g., by searching the user-specific dataset which has not been used for the longest and is presently loaded into a slot. To this end iteration can be performed, for example, via the user profiles in the data structure (profile management). The method can further check that the user-specific dataset in the central profile management (data structure) corresponds to the current version of the user-specific dataset in the slot of the storage region, possibly by a comparison or by transferring 130. If the version is current (if therefore a successful transfer has occurred after the last amendment), the slot can be displaced, the assignment to the slot in the user profile can be deleted in the profile management and the released slot number can be returned.

In one exemplary implementation, the control module 14 can, for example, be configured to execute a function for exporting data from a slot, possibly the transferring 130. For example, a dirty flag can indicate whether the data has been amended since storing in the storage region. If it has not been amended, the transferring 130 can, for example, use data which is stored in the data structure, otherwise the transferring 130 can, for example, transfer the data via the transportation vehicle bus. In some exemplary embodiments, the dirty flag can be deleted after a successful transferring 130. As a result, for example, a notification relating to an amendment of the user-specific dataset (so-called dirty notification) can be dispensed with. In some exemplary embodiments, the slot can further be reset to the works settings. If the slot is presently active, the works settings can be applied directly.

In some exemplary embodiments, the transferring 130 can further be executed before shutting down a controller, for example, when the dirty flag is set for a storage location. In this situation, the control module 14 can implicitly assume, upon receipt of the message, that the dirty flag was set previously even when it had not yet received any dirty notification.

For example, the control module 14 can be configured to interrogate via a transportation vehicle bus (possibly as broadcast) for which logic controller dirty flags are set and obtain these, for example, as a dirty notification from the logic controller as a response to the interrogation, possibly after a restart of the device 10. Alternatively or additionally, the logic controllers can be configured to automatically prepare a dirty notification in the case of an amendment of the user settings.

After a successful export (acknowledgement of the remote station), the dirty flag can then be deleted in the controller.

During the storage (possibly by the storing 140), an iteration can be performed, for example, via all the controllers (possibly logic controllers) and an updated dataset (the new user-specific dataset) can be prepared for them via an import function. If the import is completed in all logic controllers, the dataset can be activated, for example, by iterating the operation at 150 for all logic controllers or by a broadcast message. In addition, an assignment between user profile and slot can be stored in the profile management, for example, as a field in the data structure. The control module 14 can, for example, be configured to send the new user-specific dataset to the controller (or logic controller) to import this there. This can, for example, be implemented by a data import functionality which loads the user-specific dataset in a temporary import buffer and a functionality for transferring the user settings from the import buffer into a slot. After import, the dirty flag can, for example, be deleted and/or a dirty notification prepared. If the user settings are imported, these can thus be activated.

Exemplary embodiments enable an expansion to theoretically an almost unlimited number of various usable sets of settings in a transportation vehicle without a storage module needing to be expanded in the participating controller.

In at least some exemplary embodiments, the transportation vehicle 1000 can, for example, correspond to a land transportation vehicle, a watercraft, an aircraft, a rail transportation vehicle, a road transportation vehicle, an automobile, an all-terrain transportation vehicle, a transportation vehicle, or a truck. The control module 14 is coupled to the interface 12 and to the storage module 16.

A further exemplary embodiment is a computer program for executing at least one of the above-described methods, if the computer program runs on a computer, a processor, or a programmable hardware component. Another exemplary embodiment is also a digital storage medium, which is machine- or computer-readable and which has electronically readable control signals which can cooperate with a programmable hardware component so that one of the above-described methods is implemented.

The features disclosed in the preceding description, the following claims, and the appended figures can be of importance and implemented both individually and also in any combination for the implementation of an exemplary embodiment in its various configurations.

Although some properties have been described in connection with a device, it is understood that these properties also form a description of the corresponding method so that a block or a component of a device should also be understood as a corresponding process operation or as a feature of a process operation. Similarly to this, properties which have been described in connection with a or as a process operation are also a description of a corresponding block or detail or feature of a corresponding device.

Depending on the specific implementation requirements, exemplary embodiments can be implemented in hardware or in software. The implementation can be performed using a digital storage medium, for example, a floppy disk, a DVD, a Blu-ray disc, a CD, an ROM, a PROM, an EPROM, an EEPROM, or a FLASH memory, a hard disk, or another magnetic or optical storage device, on which electronically readable control signals are stored, which cooperate or can cooperate with a programmable hardware component in such a manner that the respective method is executed.

A programmable hardware component can be formed by a processor, a computer processor (CPU=central processing unit), a graphics processor (GPU=graphics processing unit), a computer, a computer system, an application-specific integrated circuit (ASIC), an integrated circuit (IC), a one chip system (SOC=system on chip), a programmable logic element or a field-programmable gate array (FPGA) with a microprocessor.

The digital storage medium can therefore be machine- or computer-readable. Some exemplary embodiments therefore comprise a data carrier, which has electronically readable control signals, which are able to cooperate with a programmable computer system or a programmable hardware component in such a manner that one of the methods described herein is performed. At least one exemplary embodiment is, therefore, a data carrier (or a digital storage medium or a computer-readable medium) on which the program for executing one of the methods described herein is recorded.

In general, exemplary embodiments can be implemented as a program, firmware, computer program, or computer program product with a program code or as data, wherein the program code or the data is or are effective to execute one of the methods when the program runs on a processor or a programmable hardware component. The program code or the data can, for example, also be stored on a machine-readable carrier or data carrier. The program code or the data can inter alia be present as source code, machine code, or byte code as well as another intermediate code.

Another exemplary embodiment is furthermore a data stream, a signal sequence, or a sequence of signals which forms or form the program for executing one of the methods described herein. The data stream, the signal sequence, or the sequence of signals can, for example, be configured to be transferred via a data communications connection, for example, via the internet or another network. Exemplary embodiments are therefore also data-representing signal sequences, which are suitable for a transmission via a network or a data communications connection, wherein the data form the program.

A program according to at least one exemplary embodiment can implement one of the methods during its execution, for example, by reading out storage locations or writing one item or several items of data into this, with the result that optionally switching processes or other processes in transistor structures, in amplifier structures, or in other electrical, optical, magnetic components or components operating according to another functional principle are brought about. Accordingly, by reading out a storage location, data, values, sensor values, or other information can be recorded by a program, determined or measured. A program can therefore record, determine or measure quantities, values, measured quantities, and other information by reading out one or more storage locations and by writing onto one or more storage locations, bring about, cause, or implement an action as well as activate other devices, machines, and components.

The exemplary embodiments described above are merely an illustration of the principles of the present disclosure. It is understood that modifications and variations of the arrangements and details described herein will be apparent to other persons skilled in the art. It is, therefore, intended that the disclosure is only restricted by the scope of protection of the following patent claims and not by the specific details which are presented by the description and the explanation of the exemplary embodiments herein.

REFERENCE LIST

10 Device
12 Interface
14 Control module
16 Storage module
100 Controller
110 Monitoring an available storage capacity
115 Selecting a storage location
120 Obtaining a new user-specific dataset
122 Receiving a new user-specific dataset
124 Retrieving a new user-specific dataset
130 Transferring data
132 Retrieving data
134 Storing data in data structure
140 Storing the new user-specific dataset in the controller
150 Activating the new user-specific dataset
500 Controller
1000 Transportation vehicle
2002; 2004; 2006 Controller
2002*a*; 2002*b*; 2004*a*; 2006*a* Logic controller
2008 Transportation vehicle bus
2010 Central controller

The invention claimed is:

1. A method for managing a storage region of a controller of a transportation vehicle, wherein one or more user-specific datasets are stored in the storage region, the method comprising:
monitoring an available storage capacity of the storage region;
obtaining a new user-specific dataset;
transferring data from the storage region of the controller to an external storage unit in response to the available storage capacity not being sufficient for storing the new user-specific dataset in the storage region; and
storing the new user-specific dataset in the storage region,
wherein the obtaining of the new user-specific dataset comprises receiving the new user-specific dataset from a server, or wherein the obtaining of the new user-specific dataset comprises a retrieving of the new user-specific dataset from a data structure.

2. The method of claim 1, wherein the storage region comprises a plurality of storage locations, wherein one storage location offers storage for one dataset, further comprising selecting a storage location of the plurality of storage locations, wherein the transfer of the data transfers the data from the selected storage location and wherein the storage of the new user-specific dataset uses the selected storage location.

3. The method as claimed in of claim 2, wherein the selection of the storage location is based on at least one element of the group of last use of the user-specific dataset which is stored in the storage location and the usage frequency of the user-specific dataset which is stored in the storage location.

4. The method as claimed in claim 2, wherein the monitoring of the available storage capacity comprises monitoring a usage of the plurality of storage locations.

5. The method of claim 1, wherein the transfer of the data further comprises a retrieving of the data from the controller and a storage of the data in a data structure on a central controller of the transportation vehicle.

6. The method of claim 1, wherein the transferring is further carried out periodically,
or wherein the transferring is further carried out when the data has been amended,
or wherein transferring is carried out before the storage of the data.

7. The method of claim 1, further comprising activating the new user-specific dataset for the controller.

8. A program with a program code for carrying out a method for managing a storage region of a controller of a transportation vehicle, wherein one or more user-specific datasets are stored in the storage region when the program code is executed on a computer, a processor, a control module or a programmable hardware component the method comprising:
monitoring an available storage capacity of the storage region;
obtaining a new user-specific dataset;
transferring data from the storage region of the controller to an external storage unit in response to the available storage capacity not being sufficient for storing the new user-specific dataset in the storage region; and
storing the new user-specific dataset in the storage region,
wherein the obtaining of the new user-specific dataset comprises receiving the new user-specific dataset from a server, or wherein the obtaining of the new user-specific dataset comprises a retrieving of the new user-specific dataset from a data structure.

9. The program of claim 8, wherein the storage region comprises a plurality of storage locations, wherein one storage location offers storage for one dataset, further comprising selecting a storage location of the plurality of storage locations, wherein the transfer of the data transfers the data from the selected storage location and wherein the storage of the new user-specific dataset uses the selected storage location.

10. The program of claim 9, wherein the selection of the storage location is based on at least one element of the group of last use of the user-specific dataset which is stored in the storage location and the usage frequency of the user-specific dataset which is stored in the storage location.

11. A device for a first controller of a transportation vehicle for managing a storage region of a second controller of the transportation vehicle, the device comprising:
an interface for communication with the second controller;
a control module for:
monitoring an available storage capacity of the storage region,
obtaining a new user-specific dataset,
transferring data from the storage region of the controller to a storage module in response to the available storage capacity not being sufficient for storing the new user-specific dataset in the storage region, and
storing the new user-specific dataset in the storage region,
wherein the obtaining of the new user-specific dataset comprises receiving the new user-specific dataset from a server, or wherein the obtaining of the new user-specific dataset comprises a retrieving of the new user-specific dataset from a data structure.

* * * * *